US008413244B1

(12) United States Patent
Nachenberg

(10) Patent No.: US 8,413,244 B1
(45) Date of Patent: Apr. 2, 2013

(54) USING TEMPORAL ATTRIBUTES TO DETECT MALWARE

(75) Inventor: Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 321 days.

(21) Appl. No.: 12/944,121

(22) Filed: Nov. 11, 2010

(51) Int. Cl.
*G06F 21/00* (2006.01)
(52) U.S. Cl. .............. 726/23; 726/24; 726/26; 713/188; 713/502; 714/48
(58) Field of Classification Search .................. 726/23, 726/24, 26; 713/188, 502; 714/48
See application file for complete search history.

(56) References Cited

U.S. PATENT DOCUMENTS

| | | | | |
|---|---|---|---|---|
| 7,203,962 | B1 * | 4/2007 | Moran | 726/23 |
| 7,373,524 | B2 * | 5/2008 | Motsinger et al. | 713/188 |
| 7,444,349 | B1 * | 10/2008 | Ochotta | 1/1 |
| 7,472,420 | B1 * | 12/2008 | Pavlyushchik | 726/24 |
| 7,676,679 | B2 * | 3/2010 | Weis et al. | 713/502 |
| 7,730,537 | B2 * | 6/2010 | Bardsley et al. | 713/188 |
| 8,060,577 | B1 * | 11/2011 | Conrad | 709/216 |
| 2005/0131900 | A1 * | 6/2005 | Palliyll et al. | 707/10 |
| 2006/0235908 | A1 * | 10/2006 | Armangau et al. | 707/204 |
| 2007/0094725 | A1 * | 4/2007 | Borders | 726/24 |
| 2007/0136817 | A1 * | 6/2007 | Nguyen | 726/26 |
| 2007/0157315 | A1 * | 7/2007 | Moran | 726/23 |
| 2008/0133706 | A1 * | 6/2008 | Chavez et al. | 709/218 |
| 2009/0125532 | A1 * | 5/2009 | Wexler et al. | 707/100 |
| 2009/0217352 | A1 * | 8/2009 | Shen et al. | 726/3 |
| 2010/0031358 | A1 * | 2/2010 | Elovici et al. | 714/48 |

OTHER PUBLICATIONS

Ting-Fang Yen and Michael K. Reiter, Traffic Aggregation for Malware Detection, Jul. 2008, 5th Conference on Detection of Intrusions and Malware and Vulnerabilty Assessment (DIMVA).*
Ficcol, M., A Weight-Based Sympton Correlation Approach to SQL Injection Attacks, Sep. 2009, Dependable Computing, 2009. LADC '09. Fourth Latin-American Symposium, pp. 9-16.*
Yanfang Ye et al., Intelligent File Scoring System for Malware Detection From The Gray List, 2009, KDD '09 Proceedings of the 15th ACM SIGKDD International Conference on Knowledge Discovery and Data Mining, pp. 1385-1394.*

* cited by examiner

*Primary Examiner* — Farid Homayounmehr
*Assistant Examiner* — Sharif Ullah
(74) *Attorney, Agent, or Firm* — Fenwick & West LLP

(57) ABSTRACT

Techniques for classifying unknown files taking into account temporal proximity between unknown files and files with known classifications are disclosed. In response to a classification request for a target file, client systems hosting (or hosted) instances of the target file are identified. For each system, files created around the time the target file was created on the system are identified. Within the identified files, files with known classifications are identified, and a score is determined for each such file to measure temporal proximity between the creation of the file and the creation of the target file. Local temporal proximity scores aggregate the scores for the client system. Global temporal proximity scores measures an aspect of the local temporal proximity scores for all identified client systems. The global temporal proximity scores are fed into a classifier to determine a classification, which is returned in response to the classification request.

18 Claims, 4 Drawing Sheets

USING TEMPORAL ATTRIBUTES TO DETECT MALWARE

BACKGROUND

1. Field of Disclosure

The disclosure generally relates to the field of computer security, in particular to detecting malicious software.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware. Accordingly, there is a need for new techniques that can reliably detect malware.

SUMMARY

Embodiments of the present disclosure include methods (and corresponding systems and computer program products) for classifying unknown files as malicious or legitimate taking into account temporal proximity between unknown files and files with known classifications.

One aspect of the present disclosure is a computer-implemented method (and corresponding computer system and computer-readable storage medium) for classifying computer files, comprises: identifying a plurality of client systems hosting a local instance of a target file; for one or more of the identified plurality of client systems, identifying a plurality of files that were created (or installed, arrived) on the client system within a pre-determined time period before or after the target file was created (or installed, arrived); and from among this set of temporally proximate files, identifying which of these files are known malicious files; for one or more of the identified known malicious files, determining a temporal score that measures the temporal proximity between the creation (or installation, arrival) of the known malicious file and the creation (or installation, arrival) of the target file; collecting temporal scores across all client systems hosting a local instance of the target file; aggregating the collected temporal scores into a single global malicious temporal proximity score; and determining a classification (e.g., legitimate or malicious) of the target file based at least in part on the global malicious temporal proximity score.

Another aspect of the present disclosure is a computer-implemented method (and corresponding computer system and computer-readable storage medium) for classifying computer files, comprises: identifying a plurality of client systems hosting a local instance of a target file; for one or more of the identified plurality of client systems, identifying a plurality of files that were created (or installed, arrived) on the client system within a pre-determined time period before or after the target file was created (or installed, arrived); and from among this set of temporally proximate files, identifying which of these files are known legitimate files; for one or more of the identified known legitimate files, determining a temporal score that measures the temporal proximity between the creation (or installation, arrival) of the known legitimate file and the creation (or installation, arrival) of the target file; collecting temporal scores across all client systems hosting a local instance of the target file; aggregating the collected temporal scores into a single global legitimate temporal proximity score; and determining a classification (e.g., legitimate or malicious) of the target file based at least in part on the global legitimate temporal proximity score.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

Figure (FIG.) 1 is a high-level block diagram of a computing environment according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
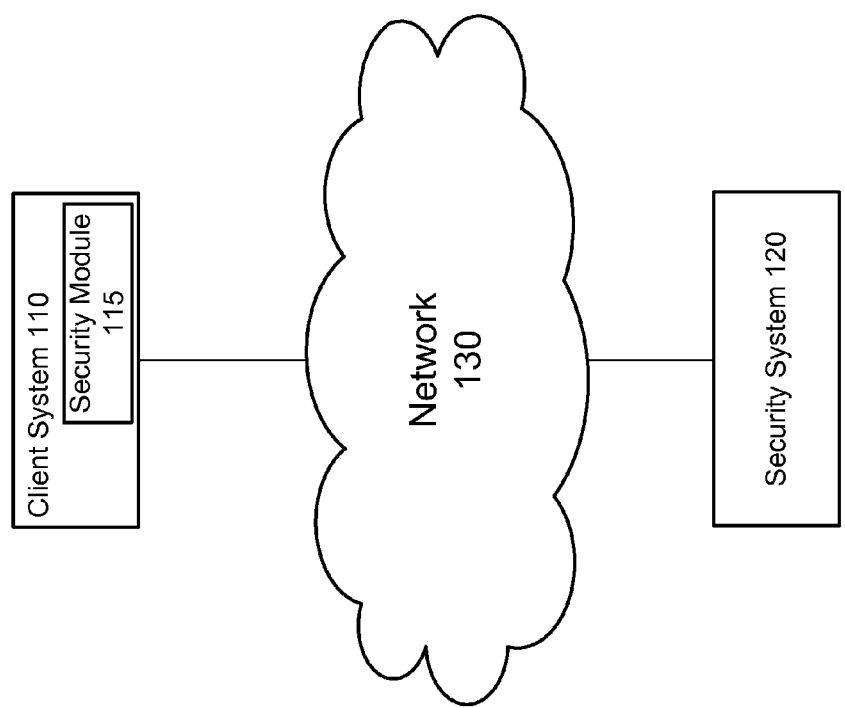

FIG. 1 is a high-level block diagram that illustrates a computing environment 100 for classifying unknown files as malicious or legitimate taking into account temporal proximity between unknown files and files with known classifications, according to one embodiment of the present disclosure. As shown, the computing environment 100 includes a client system 110 and a security system 120 connected through a network 130. Only one of each entity is illustrated in order to simplify and clarify the present description. There can be other entities in the computing environment 100 as well.

The client system 110 is an electronic device that can host malicious software. In one embodiment, the client system 110 is a conventional computer system executing, for example, a Microsoft Windows-compatible operating system (OS), Apple OS X, and/or a Linux distribution. In another embodiment, the client system 110 is another device having computer functionality, such as a personal digital assistant (PDA), mobile telephone, video game system, etc. The client system 110 typically stores numerous computer files that can host malicious software.

Malicious software, sometimes called "malware," is generally defined as software that executes on the client system 110 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client system 110 executes a security module 115 for detecting the presence of malware. The security module 115 can be, for example, incorporated into the OS of the computer or part of a separate comprehensive security package. In one embodiment, the security module 115 is provided by the entity that operates the security system 120. The security module 115 monitors computer files within the client system 110 and collects information related to file attributes and/or behaviors. The security module 115 examines a computer file (e.g., system properties, metadata) to determine values of file attributes such as the time of creation (also called the creation timestamp) and to generate a hash fingerprint of the file (e.g., a SHA-2 hash value). The security module 115 also monitors the runtime behaviors of the file to detect events of interest (e.g., attempts to modify system registry).

The security module 115 can communicate with the security system 120 via the network 130. The security module 115 transmits to the security system 120 information related to attributes and/or behaviors (e.g., creation timestamps) of files within the client system 110 along with file identifiers (e.g., hash fingerprints), and receives from the security system 120 classifications (e.g., malicious or legitimate) of the files. For example, the security module 115 can be configured to periodically transmit to the security system 120 information related to files recently created (e.g., downloaded) or modified within the client system 110 or transmit such information to the security system 120 in real-time as it is collected. In one embodiment, the transmission of information related to a newly created file constitutes a request to the security system 120 to initiate a classification of the file to increase the accuracy of classifications delivered on behalf of subsequent queries about the file. Additionally or alternatively, the security module 115 transmits the information related to the newly created file for the security system 120 to compute additional features to be used in machine learning algorithms for improving subsequent file classification. The security module 115 can also send explicit classification requests to the security system 120. The security module 115 enforces an applicable security policy based on the received classification for the file. For example, if a computer file is classified as malware, the security module 115 may prohibit the computer file from running, quarantine/clean/delete the computer file, and/or generate a warning message, depending on the policy. On the other hand, if the computer file is classified as legitimate, the security module 115 may permit the computer file to run on the client system 110, and/or stop monitoring the computer file or only monitor loosely.

The security system 120 is a hardware device and/or software program configured to receive information related to computer files (e.g., hash fingerprints, creation timestamps) from the client systems 110, and classify these files as legitimate or malicious. An example of the security system 120 is a web-based system providing security software and services allowing the security module 115 to detect and remediate malware on the client systems 110.

The security system 120 classifies a file by feeding into a classifier values of a set of various features (also called a "feature vector") determined based on information about the file received from one or more client systems 110 hosting (or that hosted) the file. One example feature measures time proximity (also called temporal proximity) between the creation of the target file and the creation of known malware in common client systems 110 (i.e., client systems 110 that host both the target file and the known malware). Another example feature measures time proximity between the creation of the target file and the creation of known legitimate files in common client systems 110.

One or more of the functions of the security system 120 can also be executed on the client system 110 or in a cloud computing environment. As used herein, cloud computing refers to a style of computing in which dynamically scalable and often virtualized resources are provided as a service over the Internet. Thus, cloud computing customers generally do not own the physical infrastructure serving as host to the software platform in question, but instead rent usage of resources from a third-party provider, where consume these resources as a service and pay only for resources used.

The network 130 enables communications between the client system 110 and the security system 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
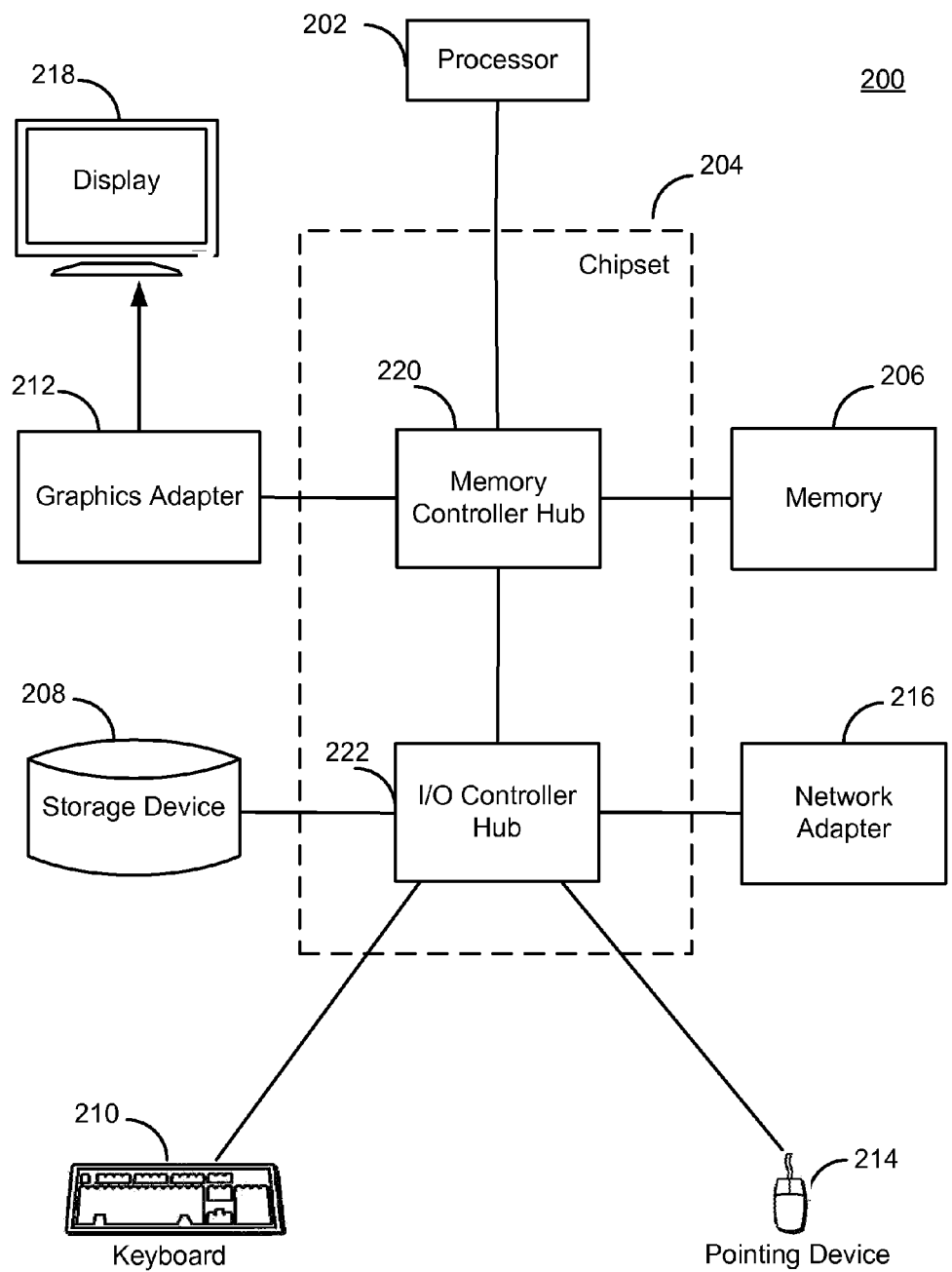
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security System

Figure 3:
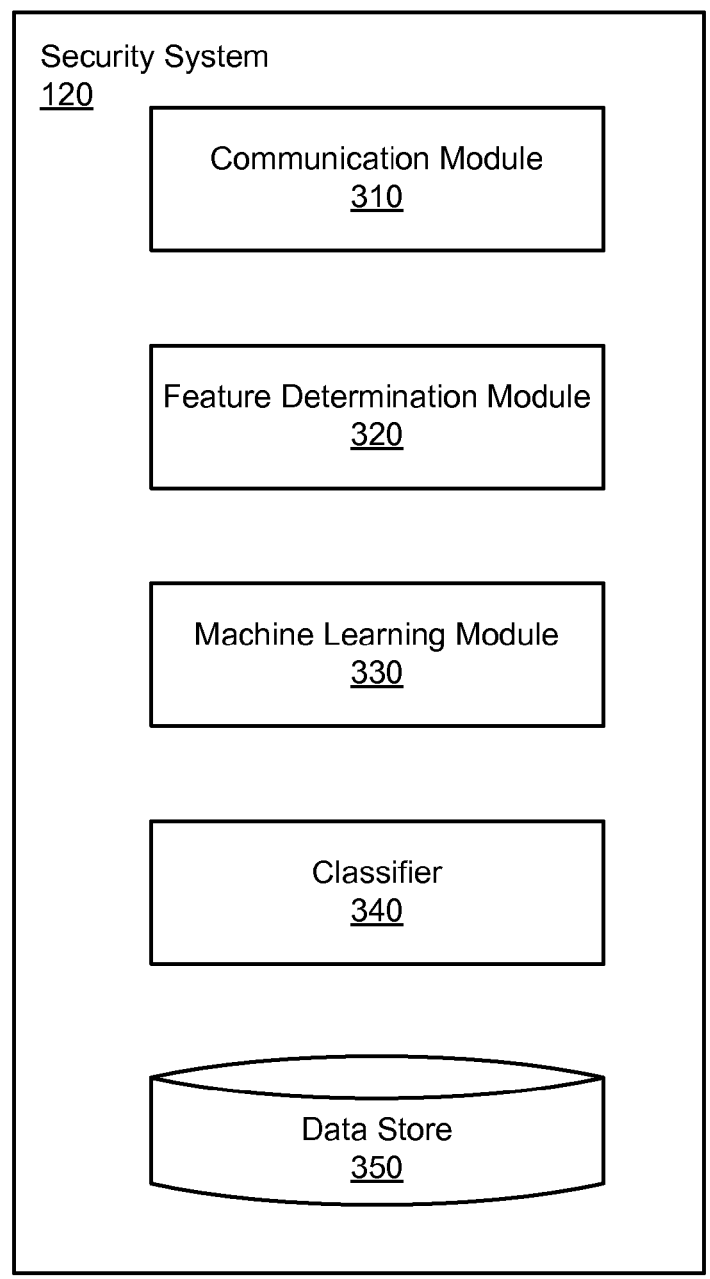
FIG. 3 is a high-level block diagram illustrating modules within a security system according to one embodiment of the present disclosure.

FIG. 3 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes a communication module 310, a feature determination module 320, a machine learning module 330, a classifier 340, and a data store 350.

The communication module 310 receives file information from the security modules 115 running on the client systems 110 and provides file classifications to the security modules 115. The file information includes file identifiers (e.g., hash fingerprints) and associated attribute values (e.g., creation timestamps). The communication module 310 stores received file information in the data store 350.

The feature determination module 320 determines feature values of a set of various features for computer files (also called "feature vectors"). A feature is a quantitative measure of one or more attributes (or behaviors) of a file that correlate to the trustworthiness of the file. For example, a feature may measure time proximity between the creation of a target file and the creation of files with known classifications in common client systems 110.

It is observed that the creation (or download) of a malicious file on a client system 110 is likely to be preceded (and/or followed) by the creation of other malicious files on that client system 110 within a short period of time. For example, when malware infects a computer, often more than one malicious file is introduced to the computer around the same time. This temporal locality phenomenon is also observed among the creation of legitimate files—legitimate files are often accompanied by other legitimate files when introduced to a computer. Thus, features measuring time proximity between the creation of an unknown file and the creation of files with known classifications can be used to render improved classification of the unknown file.

One such feature (called a "global malicious temporal proximity score") is designed to measure time proximity between the creation of a target file and the creation of known malware in common client systems 110. Another such feature (called a "global legitimate temporal proximity score") is designed to measure time proximity between the creation of the target file and the creation of known legitimate files in common client systems 110. The global malicious temporal proximity score and the global legitimate temporal proximity score are collectively called global temporal proximity scores.

To determine the value of the global temporal proximity scores of a target file, the feature determination module 320 first identifies the client systems 110 hosting (or that hosted) a local instance of the target file. For each such client system 110, the feature determination module 320 identifies files created on that client system 110 around the time the target file was created (e.g., created within a predetermined time range), identifies within such files those with known classifications (e.g., by matching their file identifiers with file identifiers of known malicious/legitimate files), and determines scores measuring time proximity between the creation of the target file and the creation of the files with known classifications on that specific client system 110. In one embodiment, for a local instance of a target file on a client system 110, the feature determination module 320 determines a local temporal proximity malicious score ($Score_{malicious}$) and a local temporal proximity legitimate score ($Score_{legitimate}$) using the following formulas:

$$Score_{malicious}(client, file_t) = \sum_{i=1}^{n} \frac{1}{|time(mf_i) - time(file_t)|}, \text{ and} \quad (1)$$

$$Score_{legitimate}(client, file_t) = \sum_{j=1}^{m} \frac{1}{|time(lf_j) - time(file_t)|}, \quad (2)$$

where client represents the current client system 110, $file_t$ represents the target file, $mf_1$ through $mf_n$ represent the known malicious files created on the client within a specified time window around (e.g., before or after) the time the $file_t$ was created, $lf_1$ through $lf_m$ represent the known legitimate files created on the client within the specified time window around the time the $file_t$ was created, and the function time( ) is the creation time of the file identified in the parentheses. The feature determination module 320 then determines the global temporal proximity scores by measuring an aspect (e.g., average, mean, median, maximum, minimum, etc.) of the local temporal proximity scores of the target file across all client systems 110 hosting (or that hosted) the target file.

The feature vectors can be used by the machine learning module 330 for generating classification logic or fed into the classifier 340 to classify files. To determine feature vectors for generating classification logic, the feature determination module 320 monitors a set of training files known to be malicious or legitimate (also called the training corpus) residing on a set of (physical or virtual) training client systems 110 to collect information related to file attributes and/or behaviors, determines feature vectors for the training files based on the collected information, and provides the feature vectors along with the known classifications of the training corpus to the machine learning module 330. In addition, the feature determination module 320 determines feature vectors for files based on related information received from client systems 110 hosting (or that hosted) the files, and provides the feature vectors to the classifier 340 to classify the files.

The machine learning module 330 generates classification logic (e.g., a decision tree) for the classifier 340 to accurately classify files based on their trustworthiness. The machine learning module 330 applies machine learning algorithms (e.g., decision tree induction algorithms) to the feature vectors and known classifications of the training corpus. By applying the machine learning algorithms, the machine learning module 330 learns the best ways of classifying a training file as legitimate or malicious on the basis of the feature vectors. Because the global temporal proximity scores measure temporal proximity between the creation of target files and the creation of files with known classifications in common training client systems 110, the machine learning module 330 determines whether and how much weight the global temporal proximity scores carry for rendering improved classification, and includes them in the final classification logic. Thus, when the classification logic is applied to feature vectors determined based on file information received from the client systems 110, temporal proximity information will automatically be leveraged by the classification logic to produce more accurate classifications.

The classifier 340 classifies files as malicious or legitimate by applying the classification logic generated by the machine learning module 330 to feature vectors determined by the feature determination module 320 for the files. In one embodiment, the classification logic is a decision tree. Using the feature vector of a file, the classifier 340 traverses down the decision tree based on outcomes of the splitting tests of the branch nodes on the path until a leaf node is reached, which provides a classification of the file. The classifier 340 may also determine a confidence score that measures the confidence the classifier 340 has in the resulting classification (i.e., the likelihood of the classification being correct). For example, the confidence score can be a continuous value ranging from 0 to 1, which a score of 0 indicating a very low confidence (e.g., the indication value of the classification is very low) and a score of 1 indicating a very high confidence (e.g., the classification almost certainly reflects the true classification of the underlying file). In one embodiment, the classifier 340 continuously classifies a file based on up-to-date related information received from the client systems 110 until the confidence score of the resulting classification exceeds a predetermined threshold value. Once the confidence score of a classification for a file exceeds the predetermined threshold value, the file is deemed as a file with known classification.

The data store 350 stores data used by the security system 120. Examples of such data include hash fingerprints of files known to be malicious or legitimate, feature vectors of training corpus, file information received from client systems 110, local/global temporal proximity scores, and classification logic, to name a few. Information related to files can be grouped together and indexed by file identifiers to facilitate rapid retrieval. The data store 350 may be a relational database or any other type of database.

Overview of Methodology for the Security System

Figure 4:
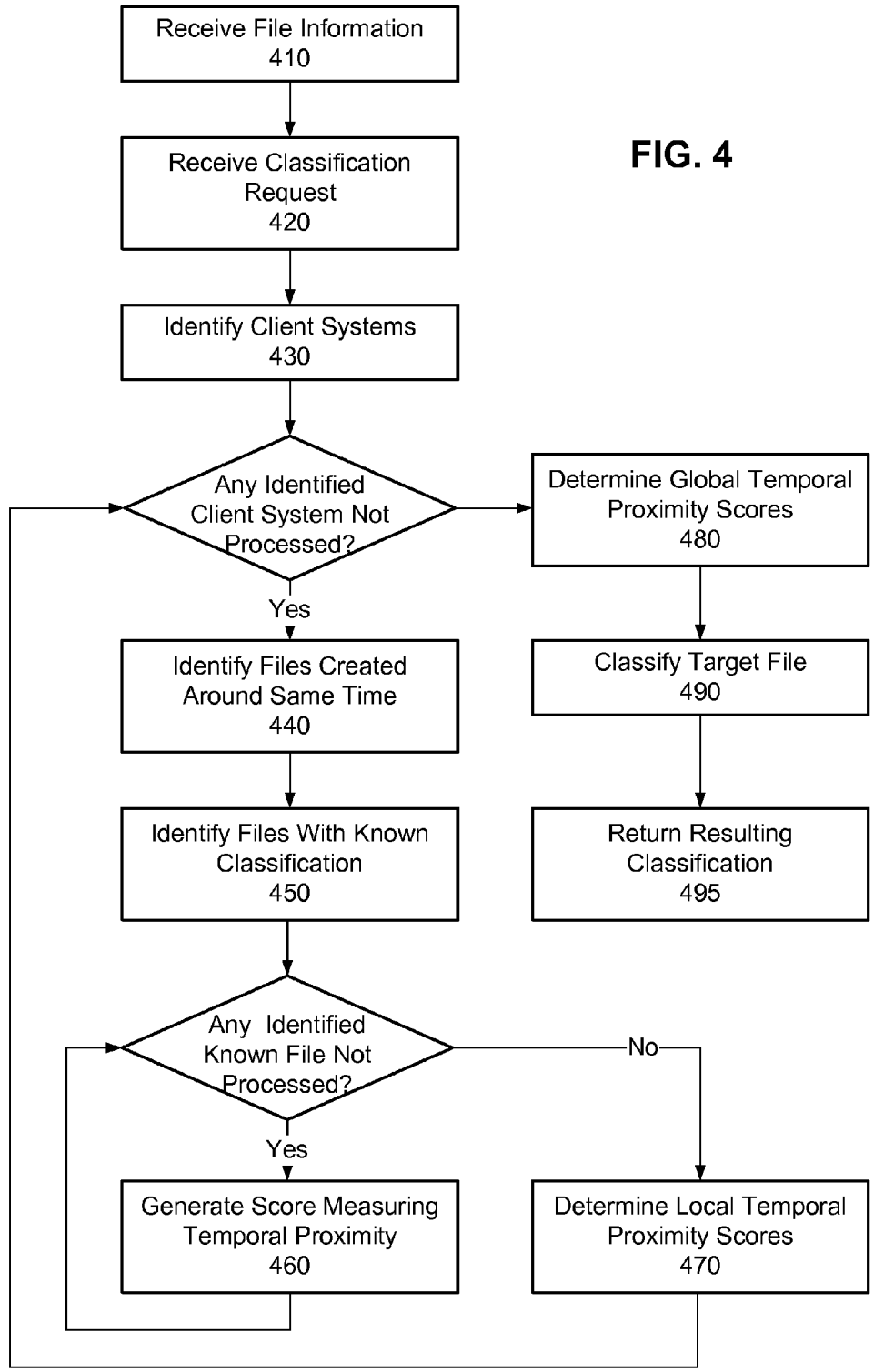
FIG. 4 is a flow diagram illustrating a process for classifying unknown files as malicious or legitimate taking into account temporal proximity between unknown files and files with known classifications, according to one embodiment of the present disclosure.

FIG. 4 is a flow diagram illustrating a process 400 for the security system 120 to classify unknown files as malicious or legitimate taking into account temporal proximity between unknown files and files with known classifications, according to one embodiment. Other embodiments can perform the steps of the process 400 in different orders. Moreover, other embodiments can include different and/or additional steps than the ones described herein.

The security system 120 receives 410 file information from client systems 110 related to files residing (or that resided) thereon. Examples of the received information include files identifiers (e.g., hash fingerprints) and information related to file attributes and/or behaviors (e.g., creation timestamps, modification timestamps). The table below illustrates information for five example files received from a client system 110.

|        | File Identifier (SHA-2 Hash Value) | Creation Timestamp (millisecond) |
|--------|------------------------------------|----------------------------------|
| File 1 | 1234                               | 3000                             |
| File 2 | 2345                               | 3001                             |
| File 3 | 3456                               | 4010                             |
| File 4 | 4567                               | 4011                             |
| File 5 | 5678                               | 4012                             |

The creation timestamps can be measured from a specific time in the past, such as the time the client system 110 made the most recent transmission to the security system 120 prior to the present transmission, the time the security system 120 received the most recent transmission, and a specific date and time.

The security system 120 receives 420 a request from a client system 110 for a classification of a target file. In one embodiment, a submission of file information related to a file by a client system 110 itself constitutes a classification request for that file from the client system 110. The client system 110 can also submit an explicit classification request in order to receive a file classification from the security system 120. The classification request includes a file identifier of the target file (e.g., a hash fingerprint).

If the target file is known to be malicious or legitimate, the security system 120 uses the known classification without re-classifying the target file, otherwise the security system 120 continues by identifying 430 client systems 110 hosting (or that hosted) a local instance of the target file (e.g., by searching the file identifier of the target file in the data store 350 for associated client systems 110).

For each of the identified client systems 110, the security system 120 identifies 440 files within that client system 110 created around the same time as the target file. For example, assuming the target file is File 3 in the above table, and the current client system 110 is the client system 110 submitting information illustrated in the above table, the security system 120 identifies 440 Files 1, 2, 4, and 5. Within the identified files, the security system 120 identifies 450 all files with known classifications (e.g., by searching in a database of known malicious/legitimate files). Continuing with the above example, assuming File 1 is unknown, File 2 is known to be legitimate, and Files 4 and 5 are known to be malicious, the security system 120 identifies 450 File 2 as known legitimate file, and identifies 450 Files 4 and 5 as known malicious files. The security system 120 determines 460 a score for each identified file with a known classification (also called a "known file") measuring a temporal proximity between when the known file is created and when the target file is created at the current client system 110, and determines 470 local temporal proximity scores aggregating the scores of the known files. For example, applying the Formula (1) and (2) to the above example, the security system 120 computes the local malicious temporal proximity score and the local legitimate temporal proximity score of the current client system 110 as follows:

$$\text{Score}_{malicious}(\text{client, file}_t) = \sum_{i=1}^{n} \frac{1}{|\text{time}(mf_i) - \text{time}(file_t)|} = \quad (3)$$

$$\frac{1}{|4011 \text{ ms} - 4010 \text{ ms}|} + \frac{1}{|4012 \text{ ms} - 4010 \text{ ms}|} = \frac{3}{2 \text{ ms}}, \text{ and}$$

$$\text{Score}_{legitimate}(\text{client, file}_t) = \quad (4)$$

$$\sum_{j=1}^{m} \frac{1}{|\text{time}(lf_j) - \text{time}(file_t)|} = \frac{1}{|3001 \text{ ms} - 4010 \text{ ms}|} = \frac{1}{1009 \text{ ms}}.$$

The security system 120 determines 480 global temporal proximity scores by measuring an aspect (e.g., average, mean, median, maximum, minimum, etc.) of the local temporal proximity scores of the target file across all identified client systems 110. For example, the security system 120 calculates 480 an arithmetic mean of the local malicious temporal proximity scores as the global malicious temporal proximity score, and calculates 480 an arithmetic mean of the local legitimate temporal proximity scores as the global legitimate temporal proximity score.

The security system 120 then feeds 490 the global temporal proximity scores along with the rest of the feature vector of the target file into a classifier to determine a classification of the target file, and returns 495 the classification to the requesting client system 110. The security system 120 may store the local/global temporal proximity scores and/or the resulting classification for subsequent usages. The process 400 repeats as additional file information and/or classification requests are received from client systems 110.

The described embodiments beneficially take into account temporal proximity between unknown files and files with known classifications, along with other features (e.g., measurements of overall hygiene of client systems 110, attributes/behaviors of unknown files), when classifying the unknown files, and thus render improved file classifications. It is observed in empirical tests that the described embodiments substantially improve in accuracy of classifying unknown files while maintaining a low level of false positive malware classifications.

Additional Embodiments

In one embodiment, at least a part of the security system 120 can be implemented in the security module 115 running on the client system 110 such that the client system 110 locally classifies files without communicating with the security system 120.

In one embodiment, the security system 120 periodically computes global temporal proximity scores for files recently created in client systems 110 (e.g., created after the previous cycle), and classifies these files based on the global temporal proximity scores and other features in a batch mode. The security system 120 responds to queries from client systems 110 regarding file classifications with the most recent classification outcomes. In alternative embodiments, the security system 120 computes the global temporal proximity scores and classifies target files in an on-demand manner (e.g., upon receiving queries from client systems 110).

In one embodiment, instead of classifying a target file as malicious or legitimate, the security system 120 can be configured to provide a more nuanced classification schema (i.e., not just malicious and legitimate but a spectrum of classifications ranging from malicious to legitimate) based on the global temporal proximity scores and other features.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for classifying unknown files as malicious or legitimate taking into account temporal proximity between unknown files and files with known classifications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for classifying computer files, comprising:
    identifying a plurality of client systems hosting a local instance of a target file;
    for one or more of the identified plurality of client systems,
        identifying a plurality of files hosted on the client system, one or more of the plurality of files associated with a timestamp within a time range around a timestamp associated with the local instance of the target file hosted on the client system,
        identifying known malicious files in the plurality of files hosted on the client system,
        for one or more of the identified known malicious files, determining a score measuring a temporal proximity between the timestamp of the malicious file and the timestamp the local instance of the target file, and
        determining a local malicious temporal proximity score measuring an aggregation of the scores of the identified known malicious files;
    determining a global malicious temporal proximity score measuring an aspect of the local malicious temporal proximity scores of the identified plurality of client systems; and
    determining a classification of the target file based at least in part on the global malicious temporal proximity score.

2. The method of claim 1, wherein identifying the plurality of client systems hosting the file further comprises identifying one or more client systems that hosted the file.

3. The method of claim 1, wherein the aspect of the local malicious temporal proximity scores measured by the global malicious temporal proximity score comprises at least one of the following: an average, a mean, a median, a maximum, and a minimum.

4. The method of claim 1, wherein the timestamp of the target file comprises a creation timestamp of the target file.

5. The method of claim 1, wherein the classification comprises malicious and legitimate, wherein a file classified as malicious is known to contain malware and a file classified as legitimate is known to not contain malware.

6. The method of claim 1, wherein the classification comprises a spectrum of classifications ranging from malicious to legitimate, wherein a file classified as malicious is known to contain malware and a file classified as legitimate is known to not contain malware.

7. A computer-implemented method for classifying computer files, comprising:
    identifying a plurality of client systems hosting a local instance of a target file;
    for one or more of the identified plurality of client systems,
        identifying a plurality of files hosted on the client system, one or more of the plurality of files associated with a timestamp within a time range around a timestamp associated with the local instance of the target file hosted on the client system,
        identifying known legitimate files in the plurality of files hosted on the client system,
        for one or more of the identified known legitimate files, determining a score measuring a temporal proximity between the timestamp of the legitimate file and the timestamp the local instance of the target file, and
        determining a local legitimate temporal proximity score measuring an aggregation of the scores of the identified known legitimate files;
    determining a global legitimate temporal proximity score measuring an aspect of the local legitimate temporal proximity scores of the identified plurality of client systems; and
    determining a classification of the target file based at least in part on the global legitimate temporal proximity score.

8. The method of claim 7, wherein identifying the plurality of client systems hosting the file further comprises identifying one or more client systems that hosted the file.

9. The method of claim 7, wherein the aspect of the local legitimate temporal proximity scores measured by the global legitimate temporal proximity score comprises at least one of the following: an average, a mean, a median, a maximum, and a minimum.

10. The method of claim 7, wherein the timestamp of the target file comprises a creation timestamp of the target file.

11. The method of claim 7, wherein the classification comprises malicious and legitimate, wherein a file classified as malicious is known to contain malware and a file classified as legitimate is known to not contain malware.

12. The method of claim 7, wherein the classification comprises a spectrum of classifications ranging from malicious to legitimate, wherein a file classified as malicious is known to contain malware and a file classified as legitimate is known to not contain malware.

13. A computer system for classifying computer files, comprising:
    a computer-readable storage medium comprising executable computer program code for:
        identifying a plurality of client systems hosting a local instance of a target file;
        for one or more of the identified plurality of client systems,
            identifying a plurality of files hosted on the client system, one or more of the plurality of files associated with a timestamp within a time range around a timestamp associated with the local instance of the target file hosted on the client system,
            identifying known malicious files in the plurality of files hosted on the client system,
            for one or more of the identified known malicious files, determining a score measuring a temporal proximity between the timestamp of the malicious file and the timestamp the local instance of the target file, and
            determining a local malicious temporal proximity score measuring an aggregation of the scores of the identified known malicious files;
        determining a global malicious temporal proximity score measuring an aspect of the local malicious temporal proximity scores of the identified plurality of client systems; and
        determining a classification of the target file based at least in part on the global malicious temporal proximity score.

14. The computer system of claim 13, wherein identifying the plurality of client systems hosting the file further comprises identifying one or more client systems that hosted the file.

15. The computer system of claim 13, wherein the aspect of the local malicious temporal proximity scores measured by the global malicious temporal proximity score comprises at least one of the following: an average, a mean, a median, a maximum, and a minimum.

16. The computer system of claim 13, wherein the timestamp of the target file comprises a creation timestamp of the target file.

17. The computer system of claim 13, wherein the classification comprises malicious and legitimate, wherein a file classified as malicious is known to contain malware and a file classified as legitimate is known to not contain malware.

18. The computer system of claim 13, wherein the classification comprises a spectrum of classifications ranging from malicious to legitimate, wherein a file classified as malicious is known to contain malware and a file classified as legitimate is known to not contain malware.

* * * * *